UNITED STATES PATENT OFFICE.

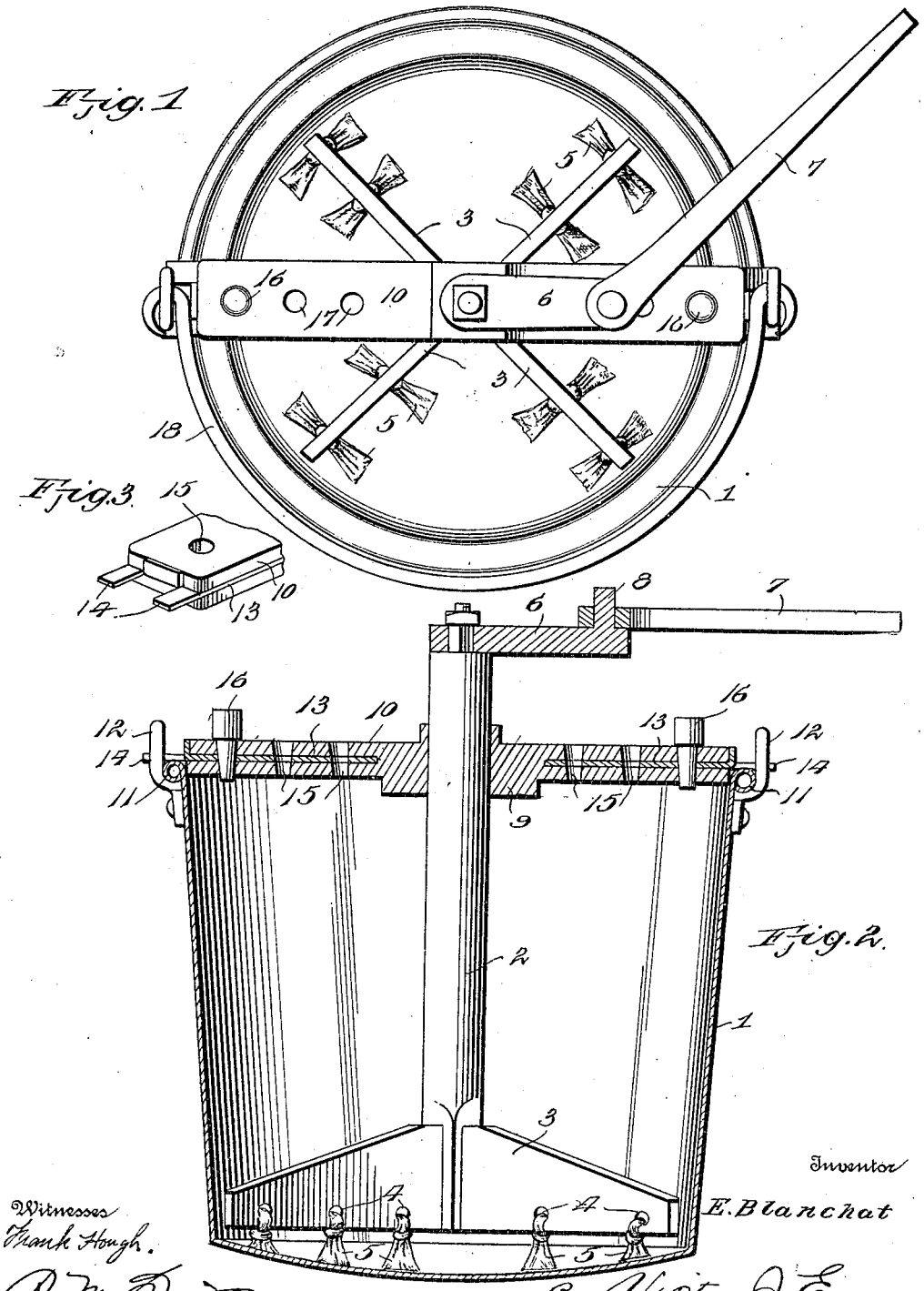

EUGENE BLANCHAT, OF GLENMONT, OHIO.

BUTTER-STIRRER.

No. 839,714.     Specification of Letters Patent.     Patented Dec. 25, 1906.

Application filed April 17, 1906. Serial No. 312,273.

*To all whom it may concern:*

Be it known that I, EUGENE BLANCHAT, a citizen of the United States, residing at Glenmont, in the county of Holmes and State of Ohio, have invented new and useful Improvements in Butter-Stirrers, of which the following is a specification.

This invention relates to butter-stirrers; and the object of the invention is to provide a simple and effective stirrer for fruit, butter, and the like which may be adjusted to kettles or vessels of different sizes and which is adapted to be operated readily to stir the contents of the kettle and prevent the same from burning.

With the above and other objects in view, the nature of which will more fully appear as the description proceeds, the invention consists in the novel construction, combination, and arrangement of parts hereinafter more fully described, illustrated, and claimed.

In the accompanying drawings, Figure 1 is a plan view of a stirrer embodying the present invention shown applied to a kettle. Fig. 2 is a sectional view of the same also shown applied to a kettle, the latter being in section. Fig. 3 is a detail perspective view of one end of the diametrical cross-bar.

In order to better disclose the nature of this invention, I have shown the stirring device applied to an ordinary kettle, (shown at 1.) The stirrer embodies, essentially, a centrally-arranged rotary shaft 2, which is provided at its lower end with a plurality of radiating wings 3, provided along their lower edges with holes 4 to receive stirring-brushes 5, composed of any suitable material and arranged in such manner as to sweep along the inner surface of the bottom of the kettle, so as to dislodge any portion of the contents of the kettle from the bottom thereof and prevent the same from being burned.

At its upper end the shaft 2 is provided with a crank 6, to which may be connected a suitable operating-handle 7, said handle being shown as provided at one end with a hole to receive an upstanding stud 8 on the end of the crank 6.

In order to support the stirring device properly in the kettle or other vessel, the shaft 2 is journaled in a bearing 9, carried by the central portion of a diametrical cross-bar 10, adapted to extend across the top of the kettle, as shown in Figs. 1 and 2, and to rest on the upper edge or rim 11 thereof. The kettle is shown as provided with the usual bail-receiving ears 12, and under the preferred embodiment of this invention the opposite ends of the bar 10 are provided with longitudinal recesses, in each of which is fitted an adjustable retainer plate or strip 13, of metal, the outer end of which projects beyond the corresponding extremity of the bar 10, where it is forked or branched, as shown at 14, to straddle the ears 12 in the manner illustrated in Figs. 1 and 3. Each of said plates or strips 13 is also provided with a plurality of holes 15, any one of which is adapted to receive a stay-pin 16, insertible through any one of a corresponding series of holes 17 in the bar 10, thereby providing for adjusting the retainer strips or plates 13 outward and inward to accommodate the bar 10 to kettles of different diameters and to enable the forked extremities of said retainer plates or strips to embrace and engage the bail-receiving ears of the kettle, so as to hold the bar 10 in place thereon, the kettle-bail 18 when thrown downward resting on the forked extremities of the plates 13 and holding the same securely in place, especially when said bail 18 is held down by one of the hands of the operator.

The stirring device hereinabove described may be adjusted to suit a kettle of any size and after once being adjusted to suit any particular kettle it may be easily and quickly inserted therein and removed therefrom, as may be required.

I claim—

A stirrer for the purpose described, comprising a receptacle having upwardly-extending bail-ears, a rotary shaft, a stirring element carried by said shaft, means for rotating said shaft, and a supporting-bar for said shaft having its opposite ends recessed, retaining-strips fitted to slide in said recesses and provided with forked extremities to engage said bail-ears, said retaining-strips and said supporting-bar being provided with registering holes, and stop-pins for holding said retaining-strips in adjusted position, substantially as described.

In testimony whereof I affix my signature in presence of two witnesses.

EUGENE BLANCHAT.

Witnesses:
    R. L. CHURCH,
    GEO. BARNES.